June 29, 1965   P. RICHARDS ETAL   3,192,459
LOAD-RESPONSIVE MOTOR GENERATOR FIELD CONTROL CIRCUIT
Filed Aug. 23, 1961
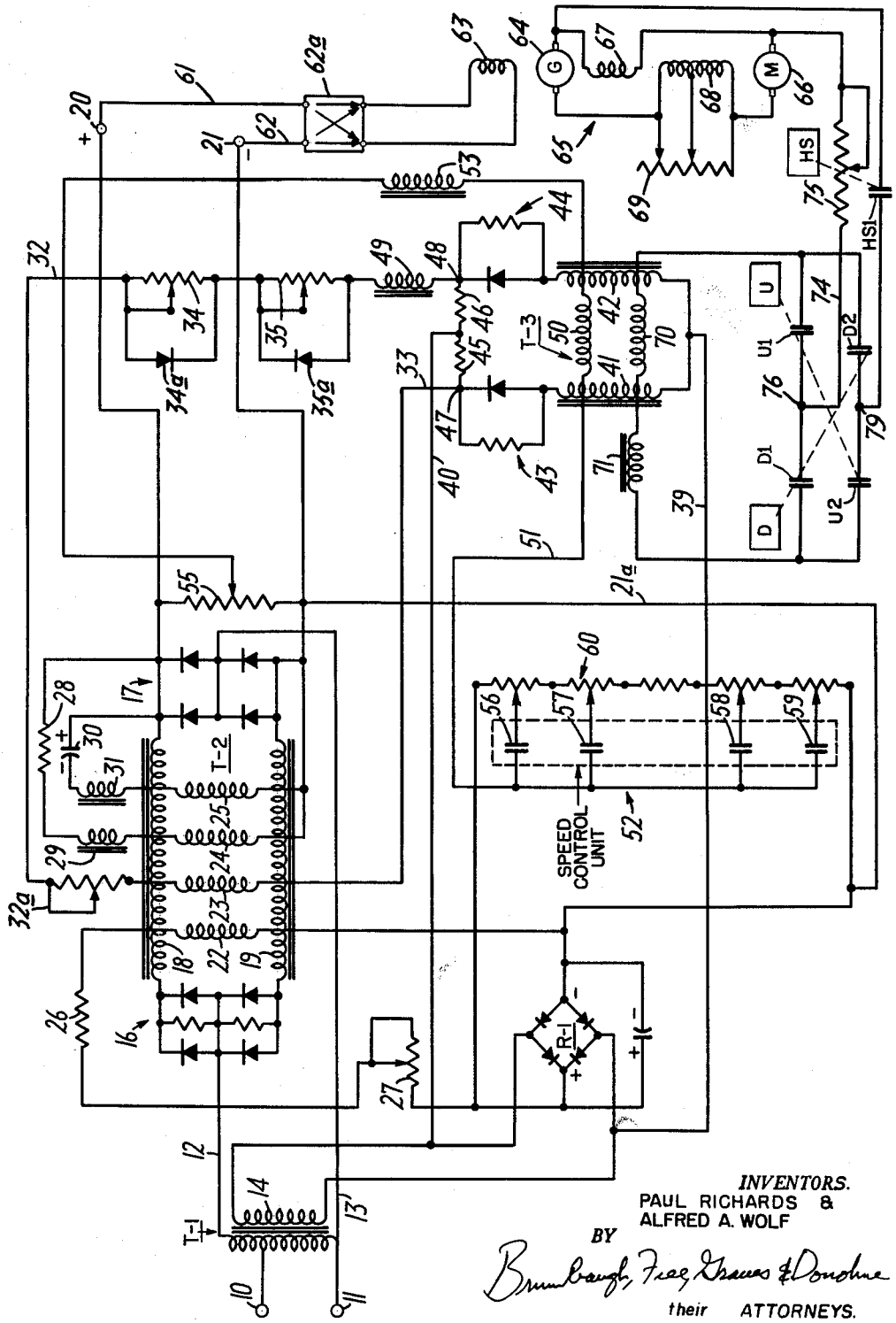
INVENTORS.
PAUL RICHARDS &
ALFRED A. WOLF
BY
their ATTORNEYS.

United States Patent Office 3,192,459
Patented June 29, 1965

3,192,459
LOAD-RESPONSIVE MOTOR GENERATOR FIELD CONTROL CIRCUIT
Paul Richards, Roselle, N.J., and Alfred A. Wolf, York, Pa., assignors to General Dynamics Corporation, New York, N.Y., a corporation of Delaware, and Fidelity Instrument Corporation, York, Pa., a corporation of Pennsylvania
Filed Aug. 23, 1961, Ser. No. 133,471
1 Claim. (Cl. 318—144)

This invention relates to a circuit for controlling the generator field of a motor generator set for example and, more particularly, to a new and improved field control circuit responsive to the load applied to the motor. This application is a continuation-in-part of our copending application for "Motor Generator Field Control Circuit," Serial No. 849,613, filed October 29, 1959, now Patent No. 3,060,367.

One form of elevator drive system employs a D.C. hoist motor supplied with voltage from the generator of a Ward-Leonard type motor generator set. Starting and stopping of the hoist motor is controlled by the application and removal of a D.C. voltage at the main shunt field terminals of the D.C. generator in the motor generator set and the speed and direction of the motor are governed by the magnitude and polarity of the applied voltage.

It will be apparent that variations in the actual load in an elevator car without some form of compensation will cause a considerable difference in speed in the opposing directions of travel, thus interfering with the accurate positioning of the car as it stops at a floor. Although various remedies for this difficulty have been proposed, such as the well known series-field regeneration arrangements, they have many inadequacies. For example, when the ratio between the maximum elevator speed and the highest speed at which the elevator can be stopped accurately is greater than twenty-five-to-one, variations in resistance due to temperature changes in the generator and hoist motor, residual magnetism in the generator, pole pieces and the like, interfere with the performance of regenerative systems. Moreover, for smoothness and efficiency of operation, the rate of change of voltage applied to the generator shunt field should be as nearly constant as possible rather than proceeding in abrupt steps as in many conventional systems.

Accordingly, it is an object of the present invention to provide a new and improved circuit for controlling the generator shunt field of a motor generator set which is free of the above-mentioned disadvantages.

Another object of the invention is to provide a control circuit capable of providing a uniform rate of change of voltage during acceleration and deceleration.

An additional object of the invention is to provide a control circuit capable of precise operation over a wider range of output voltages than has been possible heretofore.

A further object of the invention is to provide a control circuit of the above character which provides accurate compensation for variations in the load applied to the elevator motor.

These and other objects and advantages of the invention are attained by providing unidirectional magnetic amplifier means to supply a D.C. field potential for the generator of a motor generator set along with means responsive to the magnitude of the current drawn by the motor to provide a control voltage to the magnetic amplifier means and means responsive to the direction of operation of the motor to control the direction of application of the control voltage to the magnetic amplifier means. Preferably, the magnetic amplifier means comprises a first stage amplifier and a second stage amplifier, the first stage amplifier being responsive to the control voltage and to a difference signal representing the difference between the desired and the actual output voltage to produce a control signal for the second stage amplifier.

The second stage of the system preferably comprises a magnetic amplifier which generates the D.C. field potential in accordance with the control signal from the first stage and the circuit coupling the two amplifiers includes means to permit variation in the rate of change of the control signal. In addition, the second stage amplifier includes a fixed bias winding set to control the minimum operating level of the amplifier at a predetermined point while a variable bias control winding responds to the output signal from the amplifier to shift its operating point as the output voltage changes. A fourth control winding in this stage includes a reactive circuit arranged so that the overall rate of change of output potental from the amplifier is linear with respect to time.

Further objects and advantages of the invention will be apparent from a reading of the following description in conjunction with the accompanying drawing which is a schematic circuit diagram illustrating a representative embodiment of the field control circuit of the invention.

As illustrated in the drawing, power is supplied to the control circuit of the invention through two terminals 10 and 11 from any conventional source of alternating current to the primary winding of a transformer T-1. This transformer acts as a auto-transformer supplying appropriate output voltage at two conductors 12 and 13 for energization of a magnetic amplifier reactor T-2 and also includes a secondary winding 14 providing A.C. power to a full wave rectifier unit R-1. Preferably, the transformer T-1 is arranged so that the A.C. potential across the lines 12 and 13 is approximately 240 volts, while the winding 14 generates 120 volts so that the full wave rectifier unit R-1 provides a D.C. reference voltage of approximately 85 volts.

In order to drive the magnetic amplifier T-2, which comprises the second stage of the system, two full wave rectifier units 16 and 17 apply rectified voltage from the conductors 12 and 13 to opposite ends of the two main windings 18 and 19 of the amplifier, respectively. Each of these windings is connected at one end to one of two field potential output terminals 20 and 21 normally producing a maximum D.C. potential of approximately 170 volts between these terminals, the terminal 21 being joined to the negative side of the rectifier unit R-1 through a conductor 21a.

Four control windings 22, 23, 24, and 25 are included in the magnetic amplifier T-2 to regulate the D.C. output voltage and provide efficient elevator speed control in accordance with the present invention. The first of these windings 22 is connected through a resistor 26 and a rheostat 27 to the reference D.C. voltage supplied by the rectifier R-1, as previously described, thereby inducing a fixed bias potential in the magnetic amplifier. By adjusting the setting of the rheostat 27, this bias, and consequently the minimum operating point of the amplifier, may be set at any desired level and preferably this level is selected to provide the lowest desired amplifier output potential at the terminals 20 and 21.

In addition, the control winding 24 is arranged to supply a variable bias potential to the amplifier in accordance with the operating level of the system. To this end, positive feedback voltage from the output energizes the winding 24 through a series resistor 28 and choke 29, the resistor being selected to limit the feedback voltage to the proper value and the choke being included to smooth out any ripple from the feedback voltage. It will be apparent that the unique arrangement of the fixed bias winding and the feedback controlled bias winding results in an automatic variable bias which maintains the operating point of the amplifier within the range of driving power available from a control signal produced by the first amplifier stage described hereinafter. Consequently, this makes it possible to maintain full control of the output voltage of the system over a maximum-to-minimum voltage ratio of at least fifty-to-one.

In accordance with another feature of the present invention, a reactive circuit including, for example, a series capacitor 30 and inductance 31, is connected from the output of the second stage amplifier T-2 to energize the control winding 25. By an appropriate selection of the values of these reactive elements in conjunction with that of the winding 25, this circuit can be adjusted to introduce an extended linear rate of change in the response time of the magnetic amplifier and, in a particular instance, a forty microfarad capacitor and a twenty henry inductance were found suitable for this purpose. With this arrangement, the rate of change of the output voltage of the system is made linear with respect to time regardless of the rate of change of the control signal.

The fourth winding 23 in the second stage magnetic amplifier is coupled to receive control voltage signals from a preamplifier T-3 through two conductors 32 and 33 and an adjustable resistor 32a. In order to regulate the rate of change of these control signals and thereby regulate the rate of acceleration and deceleration of the elevator hoist motor, this coupling circuit includes two series rheostats 34 and 35 shunted by corresponding rectifiers 34a and 35a which are oriented in opposite directions. It will be readily apparent that each of these rheostats passes current only in one direction, current being bypassed through the corresponding rectifier when it flows in the other direction. Accordingly, the rate of change of the applied control signal in one direction, e.g. for acceleration of the drive motor, can be regulated by adjusting the rheostat 34, while the rate of change of the signal in the other direction, e.g. for deceleration, is controlled by the rheostat 35.

Driving power for the preamplifier T-3 is derived through two conductors 39 and 40 connected to opposite ends of the secondary winding 14 of the power transformer T-1, respectively. Two reactor windings 41 and 42, each forming a separate arm of a bridge network and constituting the main windings of the reactor T-3, are connected at one end to the conductor 39 and have circuits 43 and 44 comprising parallel-connected resistance and rectifier elements joined to their unconnected ends, respectively. The other arms of the bridge network are formed by two resistors 45 and 46, each joined at one end to the conductor 40 and forming junctions 47 and 48 at their other ends with the circuits 43 and 44, respectively. Output signals indicating unbalance of the bridge network are transmitted to the control winding 23 of the magnetic amplifier T-2 through the conductor 33 which is connected to the junction 47 and through the line 32 which leads to the junction 48 through the adjustable resistor 32a, the rheostats 34 and 35, and a filter choke 49. As a result, any variation from the balanced condition generates a control signal which is applied to the second stage amplifier, producing a corresponding change in the voltage at the output terminals 20 and 21.

In order to effect unbalance of the bridge network in accordance with any difference between the actual generator field potential and the desired field potential, the magnetic amplifier T-3 includes a control winding 50 connected at one end through a conductor 51 to a conventional speed control unit 52 providing a reference voltage proportional to the desired hoist motor speed and at the other end through a series inductance 53 to the movable contact of a potentiometer 55 connected across the output of the second stage amplifier T-2. The value of the inductance 53 is selected to discriminate against and filter out all pulsating induced voltages which would otherwise generate false control signals in the amplifier T-3 and, in a particular case, an inductance of twenty henries was found to be satisfactory.

According to conventional magnetic amplifier practice, the mounting of the control winding 50 is arranged so that a D.C. current in one direction will cause the reactance in one of the reactor windings 41 and 42 to increase and that of the other winding to decrease, while a current in the opposite direction will cause a reverse effect. Thus, the resulting rectified voltages appearing across the resistors 45 and 46 forming the other two arms of the bridge will be opposed and unequal, the degree of inequality being proportional to the difference between the reference voltage supplied by the speed control unit 52 and the potential at the contact of the potentiometer 55, which is in direct proportion to the output voltage of the system. Inasmuch as the control winding 23 of the second stage amplifier is connected across these resistors at the junctions 47 and 48 in the manner described above, the difference between the rectified voltages across these resistors is utilized to control the second stage amplifier T-2.

Because the control current through the winding 23 is proportional to the difference between a selected fraction of the output voltage and a reference voltage, the system is maintained as close to the desired value of output potential as the required driving current for the control winding will permit. Consequently, the degree of control available is affected by the amount of resistance in series with the preamplifier output and the control winding 23. Accordingly, the resistor 32a is adjusted to provide the maximum desired rate of response to the control signal from the preamplifier T-3, while the rheostats 34 and 35 are set to provide the desired rate of response in each direction.

As previously mentioned, the speed control unit 52 is of the usual type and includes four normally open relay contacts 56, 57, 58, and 59, each arranged when closed to connect the conductor 51 to a selected point on a voltage divider 60, the divider being connected across the rectifier R-1. Consequently, any of four selected reference potentials can be applied to one end of the control winding 50 by actuation of a relay closing an appropriate contact in the speed control unit 52. If desired, of course, additional relay contacts and divider taps can be included to provide more accurate selection of the desired elevator speed.

The voltage applied by the magnetic amplifier T-2 to the terminals 20 and 21 is carried by two conductors 61 and 62 through a conventional reversing switch 62a to the main shunt field winding 63 of the generator in a motor generator set 65 of the Ward-Leonard type. In this set the armature 64 of the generator is driven by a drive motor (not shown) and supplies current to the armature 66 of an elevator hoist motor in accordance with the voltage applied to the generator field winding 65. This circuit includes the usual interpole winding 67 and field regeneration winding 68 connected in series between the armatures, the latter winding being shunted by a resistance 69 having a dual adjustment to control the regeneration current.

As thus far described, the motor generator field control circuit supplies a D.C. voltage for the main shunt field winding 63 in the generator of the motor generator set having a magnitude determined solely by the setting of the speed control unit 52. Because of changes in the elevator load, however, the speed of the hoist motor armature 66 may vary considerably from the desired value selected by the speed control unit 52, even though the voltage at the terminals 20 and 21 is correct.

In order to compensate for this variation in speed, the circuit of the present invention includes means deriving a control voltage responsive to the magnitude of the current supplied from the generator to the motor which, for a given motor speed varies with the motor load, along with means for applying the control voltage to the first stage magnetic amplifier in accordance with the direction of rotation of the hoist motor. To this end, the preamplifier T-3 of the illustrated embodiment of the invention includes a second control winding 70 connected in series with a choke 71 and two pairs of normally open contacts D1, U1 and D2, U2, respectively, connected in parallel. The contacts D1 and D2 are closed by operation of the down direction relay D of the elevator control system while the contacts U1 and U2 are closed by operation of the up direction relay U.

In addition, a conductor 74 leads from the motor armature brush to which the interpole winding 67 is connected through a rheostat 75 to the junction 76 of the two contacts D1 and U1, while another conductor 77 leads from the opposite end of the interpole winding through a normally open high speed relay contact HS1 to the junction 79 of the contacts D2 and U2. In order to permit operation of the load compensating portion of the circuit only when the elevator control system is in the maximum speed condition, the normally open contact HS1 is closed by operation of the high speed relay HS of the elevator control system. Also, to provide the proper amount of voltage feedback, the resistor 75 is adjusted until the compensation circuit eliminates the difference in elevator speed between the "up" and "down" directions with a fully loaded elevator. The foregoing load compensating circuit arrangement permits the use of a relatively simple unidirectional magnetic amplifier system without the necessity for employing a balanced bridge in the output of the control circuit with its attendant inefficiency and difficulty of maintaining proper bridge balancing.

In operation, A.C. power is applied to the input terminals 10 and 11 energizing the magnetic amplifier T-2 through the rectifier units 16 and 17. A fixed D.C. bias current supplied from the rectifier unit R-1 is passed through the control winding 22 setting the amplifier output at its minimum operating point. Also, the voltage divider 60 is energized from this rectifier unit while the preamplifier T-3 is energized from the secondary winding of the transformer T-1.

When a given hoist motor speed is desired, a corresponding contact in the group 56, 57, 58, and 59 of the speed control unit 52 is closed, applying a corresponding potential to one end of the control winding 50. If the voltage at the potentiometer 55 differs from this, indicating that the output voltage of the system is not at the level required to drive the hoist motor at that speed, current flows through the winding 50, unbalancing the bridge and applying current through the control winding 23 of the amplifier T-2 in a direction to reduce the difference. By adjusting the resistors 34 and 35, the rate at which such changes affect the output of the system can be varied. As the output voltage of the amplifier T-2 changes, the current through the variable bias control winding 24 also changes, shifting the amplifier operating level and providing an increased range of control. Also, the control winding 25 responds to any change in output voltage to assure a substantially linear rate of voltage change with time.

The voltage produced at the terminals 20 and 21 by the amplifier T-2 is applied through the conductors 61 and 62 to the generator field winding 63 of the motor generator set 65, thereby causing a selected voltage to be generated and applied to the hoist motor armature 66. If the hoist motor is driving a loaded elevator in the "up" direction at maximum speed, the current through the interpole winding 67 is greater than normal and a voltage signal proportional to this current is supplied to the winding 70 of the preamplifier T-3 in the proper direction to increase the voltage at the terminals 20 and 21, the contacts U1, U2 and HS1 being closed. As a result, the elevator speed is increased to the normal value. When the elevator operates in the "down" direction, the contacts D1 and D2 are closed and the lower voltage feedback signal resulting from increased elevator speed is applied to the winding 70 in the proper direction to reduce the voltage at the terminals 20 and 21.

Although the invention has been described herein with reference to a specific embodiment, many modifications and variations therein will readily occur to those skilled in the art. Accordingly, all such modifications and variations are included within the intended scope of the invention as defined by the following claim.

We claim:

A motor generator field control system comprising first magnetic amplifier means providing an output voltage and including a control winding, means providing a signal representative of the output voltage of the first magnetic amplifier means, reference voltage means producing a reference voltage signal representative of a desired output voltage from the system, bridge network means including second magnetic amplifier means forming two arms of the bridge and having a first control winding responsive to differences between the reference voltage signal and the signal representative of the first magnetic amplifier output voltage, circuit means coupling the output of the bridge network means to the control winding means of the first magnetic amplifier means, a second control winding in the second magnetic amplifier means, means for applying to the second control winding a control signal which varies in accordance with a load driven by a motor of a motor generator set to which the first magnetic amplifier means output voltage is applied, means controlled in accordance with the direction of rotation of the motor to control the direction of application of the control signal to the second control winding of the second magnetic amplifier means, and means for adjusting the magnitude of the control signal applied to the control winding so as to cause the motor to operate at the same speed in both directions with a given load applied in one direction to the motor, including two variable impedance devices connected in series in the circuit means coupling the output of the bridge network means to the control winding means of the first magnetic amplifier means and two unidirectional current conducting devices, one shunting each of the impedance devices, connected in opposed directions in the circuit means, thereby regulating the rate of change of signals applied to the control winding means of the first magnetic amplifier means.

References Cited by the Examiner

UNITED STATES PATENTS

| | | | |
|---|---|---|---|
| 2,856,572 | 10/58 | Pinto | 318—144 |
| 2,884,578 | 4/59 | Bradburn et al. | 318—144 X |
| 2,992,376 | 7/61 | Picking et al. | 318—144 X |
| 3,060,367 | 10/62 | Richards et al. | 322—39 |

ORIS L. RADER, *Primary Examiner.*